May 13, 1958 K. I. POSTEL ET AL 2,834,297
POWER TRANSMISSION
Filed Feb. 12, 1953 3 Sheets-Sheet 3

*INVENTORS*
KENNETH I. POSTEL
CONRAD J. HOHMANN
BY
*Ralph R. Tweedale*
ATTORNEY

United States Patent Office 2,834,297
Patented May 13, 1958

2,834,297
POWER TRANSMISSION

Kenneth I. Postel, Detroit, and Conrad J. Hohmann, Grosse Pointe Woods, Mich., assignors to Vickers Incorporated, Detroit, Mich., a corporation of Michigan Application February 12, 1953, Serial No. 336,531

3 Claims. (Cl. 103—162)

This invention relates to power transmissions, and is particularly applicable to those of the type comprising two or more fluid pressure energy translating devices, one of which may function as a pump and another as a fluid motor.

More particularly, it relates to a fluid pump or motor of the axial piston type and having articulated connecting rods in which the stroke is adjusted by varying the angular relation between the drive shaft and the cylinder barrel.

Pumps and motors of this type have found very wide use as components of hydraulic transmissions utilized for driving aircraft accessories. In any unit intended for aircraft applications a fundamental consideration is that size and weight be kept to the absolute minimum compatible with proper function.

The most widely used devices of the type mentioned are those in which the cylinder barrel and the associated valve plate are supported in the housing of the device by a yoke member pivotally supported in the housing by a pair of coaxial, hollow pintles. These pintles serve to both support the yoke and to conduct fluid to or from the cylinder barrel from or to the exterior connection ports of the device. In such devices, prior to the present invention, it has been the practice to provide pintles separate from the yoke on which the yoke is pivotal, and which pintles support the axial force due to fluid pressure therein without exerting it on the yoke. Such a pintle construction is illustrated in the patent to Kenneth I. Postel, 2,586,991. To support the radial load on the pintles exerted by the yoke, it was found necessary to support each pintle at opposite sides of its juncture with each arm of the yoke. Such construction is both space consuming and heavy as contrasted to the construction of the present invention.

Another factor contributing to the bulk and weight of previous devices has been the manner of securing the valve plate to the yoke and the manner in which communication between fluid passages in those two members has been effected. In the past it has been standard practice to provide axially abutting surfaces on the two members and fluid passages therein which are coincident at the juncture of the two surfaces. Such an arrangement provides fluid passages having effective areas exposed to pressure so as to tend to separate the two members, thus necessitating very rigid construction of the two parts, and high strength fastening means for securing the two members together.

It is an object of this invention to provide an exceedingly compact and light-weight variable displacement pump or motor without sacrifice in performance or structural ruggedness. This is accomplished by an improved yoke-pintle construction and support therefor as well as an improved yoke and valve plate construction.

It is standard practice in pressure compensated pumps to provide a stroke controlling motor and a control valve for the actuation thereof. Prior construction and arrangement of the stroke controlling motor and the control valve have been wasteful of space.

It is therefore also an object of this invention to provide an improved construction which affords space saving disposition of the pressure control valve and the control motor for varying the stroke of the unit.

Further objects and advantages of the present invention will be apparent from the following description, reference being had to the accompanying drawings wherein a preferred form of the present invention is clearly shown.

Figure 1:
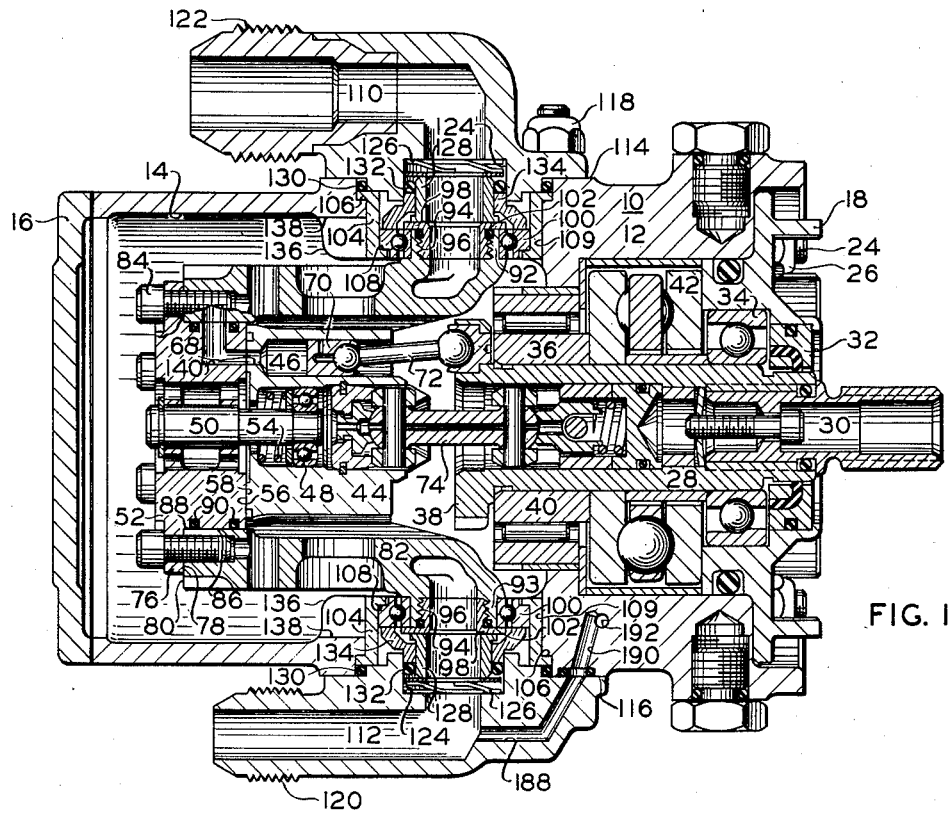
Figure 1 is a longitudinal section through a variable stroke fluid pump incorporating the present invention.
Figures 2, 3:
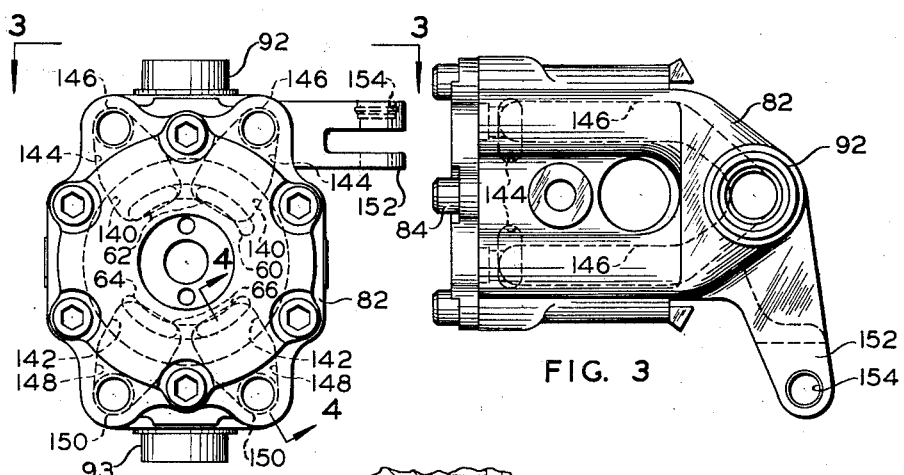
Figure 2 is a view of the assembly of yoke and valve plate used in the device of Figure 1.
Figure 3 is a view on line 3—3 of Figure 2.
Figure 4:
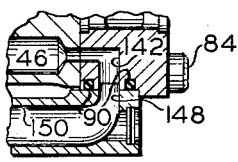
Figure 4 is a partial section taken on line 4—4 of Figure 2.

Referring now to Figure 1 the pumping unit has a housing 10 which includes a main body portion 12 which has a chamber 14 therein and is enclosed at its ends by a cover 16 and a bearing sleeve 18. The cover 16 is secured to the main body 12 by the studs 20 and the nuts 22. The bearing sleeve 18 is secured in place by the studs 24 and nuts 26.

A drive shaft 28 having a splined coupling shaft 30 secured thereto extends from the housing 10 through the bearing sleeve 18. A shaft seal 32, carried by the bearing sleeve 18, insures against leakage from the interior of the housing at the point of emergence therefrom of the shaft 28. Shaft 28 is rotatably supported in the housing 10 by a ball bearing 34 and a roller bearing 36. Shaft 28 includes a flange 38 which contacts the inner race 40 of the roller bearing 36 to transmit radial thrust on the shaft 28 to an axial thrust bearing 42.

A cylinder barrel 44, having a plurality of cylinder bores 46 therein, only one of which is shown, is rotatably supported on a bearing 48 which is in turn supported on a cylinder bearing pin 50 which extends from a valve plate 52. A spring 54 exerts force between bearing 48 and cylinder barrel 44 to bias the valve face 56 of the barrel into abutting contact with the face 58 on the valve plate 52. The face 58 forms a distributing valve member having an inlet port 60 and an outlet port 64. A pair of passages 62 extend axially into the valve plate 52 from inlet port 60 and similar passages 66 extend from outlet port 64. Each cylinder bore 46 has a distributing port 68 which extends to the face 56 and cooperates with the distributing valve member during rotation of the cylinder barrel.

Each cylinder bore 46 has therein a piston 70 to which is ball-jointed an articulated connecting rod 72, the other end of which is ball-jointed to the flange 38 of the drive shaft 28. A universal link and pin assembly 74 is drivingly connected between the drive shaft 38 and the cylinder barrel 44 to provide conjoint rotation thereof.

The valve plate 52 has a radially extending flange 76 which includes a face 78 that abuts the end face 80 of a yoke 82. Faces 78 and 80 are secured in abutment by a plurality of bolts 84 which extend through the flange 76 and into the yoke 82. The valve plate 52 includes a cylindrical pilot portion 86 which extends perpendicularly from the face 78 and snugly engages a complementary bore 88 in the yoke 82. The pilot 86 is encircled by a pair of axially spaced O ring seals 90 which engage the bore 88 in a fluid sealing relation.

The yoke 82 has formed integrally therewith a pair of coaxial pintles 92 and 93. Pintles 92 and 93 are hollow and each is internally threaded at 94 to receive an externally threaded sleeve 96. Sleeves 96 include outwardly extending shoulders 98 which overhang the outside diameters of pintles 92 and 93 and provide abutments for the inner races of pintle bearings 100. The deformable sealing elements 102 prevent leakage at the juncture between the pintles and sleeves 96. Bearings 100 are supported in the housing 10 by sleeves 104 which are outwardly flanged at 106 to abut the housing 10 and are inwardly flanged at 108 to abut the outer race of bearings 100. Sleeves 104 are retained in stepped bores 109 in the housing 10 by axial abutment with flanges 110 and 112, which are secured to the mounting pads 114 and 116, respectively, by nuts 118. Outlet flange 112 is threaded at 120 for connection of a delivery conduit, and inlet flange 110 is threaded at 122 for connection of a return conduit. Each of the flanges is chambered at 124 to receive a finger spring 126 which retains a metal sealing element 128 in axial abutment with the flanged end of sleeve 96. Sealing elements 128 are of the type described in the patent to Kenneth I. Postel, 2,586,991. Stated briefly, the axially opposed areas of the seals 128 are so proportioned as to maintain a slight pressure unbalance to bias the seals toward the flanged end of sleeves 96.

O ring seals 130 prevent leakage between the flanges and the housing, and O ring seals 132 prevent leakage between the flange and the sealing elements 128. Seals 132 are supported by members 134 which abut the outer races of bearings 100.

Pintles 92 and 93 are formed as integral arms extending from the yoke 82 thus providing a high strength, compact, unitary yoke and pintle member. The construction utilized permits of light weight construction of the yoke member since hydraulic loads thereon created by pressure in the pintles is not transmitted through the yoke but is supported locally by the pintles in which the pressure exists. For example, pressure in the outlet pintle 93 will create an axial force tending to move the pintle 93 away from the outlet flange 120. This force, however, is localized and supported as a force which is transmitted from the flange 98 to the inner race of bearing 100 and thus to the outer race, where it is supported by the inwardly flanged end of sleeve 104 and transmitted to the housing 10.

To permit assembly of the yoke 82 into the housing 10 there are provided cutaway portions 138 in the housing pintle bosses 136, extending to the stepped bores 109. Assembly procedure is as follows:

With the end cover 16 removed, yoke 82 is inserted into the chamber 14. Pintles 92 and 93 pass radially of bores 109 freely through the cutaway portions 138 of the bosses 136 and are properly positioned coaxial with the bores 109 in the housing 10. Sleeves 104 are then inserted in the bores 109 and the bearings 100 are placed in position. Sleeves 96 and their associated seals 102 are then threaded into pintles 92 and 93 and properly tightened. Sealing elements 128 and the O ring seal retainers 134 are then installed Finally, seals 130 and 132, the finger springs 126, and the flanges 110 and 112 are installed. Sleeves 104, in cooperation with the bearings 100, provide walls which close cutaway portions 138 and prevent radial return movement of the pintles 92 and 93 through the cutaway portions 138.

During operation of the pump, those cylinders 46, which are on the intake stroke, must be connected to the inlet port at the inlet flange 110 while those that are on the discharge stroke must be connected to the outlet flange 112. Cooperating passages of the valve plate 52 and the yoke 82 perform this function. Inlet port 60 has connected thereto a pair of L-shaped passages 140 which include the passages 62 extending axially into the valve plate 52 and have portions extending radially to the periphery of the pilot portion 86 of valve plate 52 intermediate the O ring seals 90. Similarly, outlet port 64 has connected thereto a pair of L-shaped passages 142, which include the axially extending passages 66, and have portions extending radially to the periphery of the pilot portion 86 intermediate the O ring seals 90. Coincident with the passages 140 at the juncture between pilot 86 and bore 88 are a pair of radial passages 144 in the yoke 82. Each passage 144 is intersected by an axially extending passage 146. Passages 146 each communicate with the hollow pintle 92 which as heretofore described communicates with the inlet flange 110. In like manner, a pair of radial passages 148 in the yoke 82 coincide with the radial portion of passages 142 at the juncture of pilot 86 and bore 88. Radial passages 148 are intersected by axially extending passages 150 which communicate with the hollow pintle 93, and hence outlet flange 112. O ring seals prevent axial leakage from the cooperating radial passages in the yoke 82 and the valve plate 52 at their juncture. Peripheral leakage around the pilot 86 between the high pressure passages and low pressure passages is prevented by the snug fit between the pilot 86 and the bore 88 and the substantial peripheral distance separating them. This improved construction of the valve plate and yoke and the manner in which the cooperating passages therein communicate, avoids any component of force tending to axially separate the valve plate and the yoke due to fluid communication therebetween.

Such an arrangement makes possible the use of fewer and smaller bolts to secure the valve plate to the yoke. A substantial saving in size and weight is the result of this construction.

Figure 5:
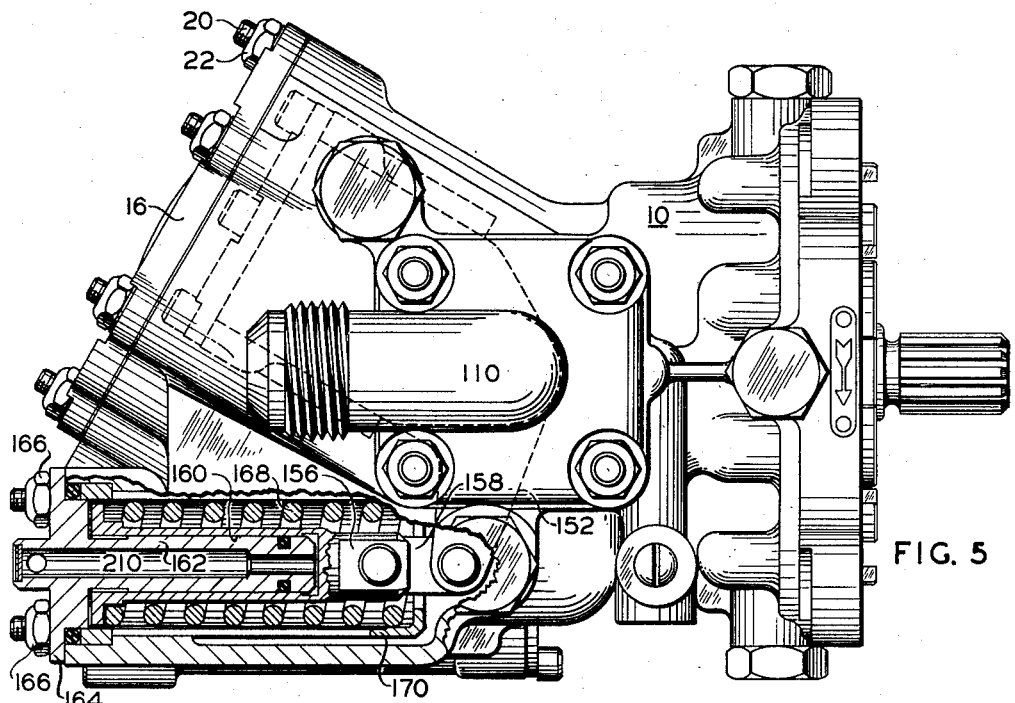
Figure 5 is a top elevation partially in section of the device in Figure 1.

The device illustrated is a pump of the pressure compensated type. A pressure compensated pump is one in which, as the operating pressure tends to exceed a desired maximum has automatic means for reducing the pump stroke, thereby maintaining the power output of the pump within acceptable limits. The yoke 82 is provided with an extending ear 152 having a clevis pin hole 154 therein. As can best be seen in Figure 5 a control piston 156 is pin connected through a link 158 to the ear 152 on the yoke 82. Piston 156 has a central bore 160 therein which is in slidable fluid sealing engagement with a pilot 162 extending from a cover 164 which is secured to the housing 10 by a plurality of nuts 166. As can be seen, the longitudinal axis and path of travel of the control piston is parallel to the axis of the drive shaft of the unit. A spring 168 is restrained by a spring retainer 170 to bias the piston 156 toward a position inducing maximum stroke of the pumping mechanism.

Operation of the control piston 156 is under control of a pressure operated control valve 172. Control valve 172 is mounted on a pad 174 on the housing 10 positioned below the housing protrusion 176 which encases the stroke control piston 156.

Figure 6:
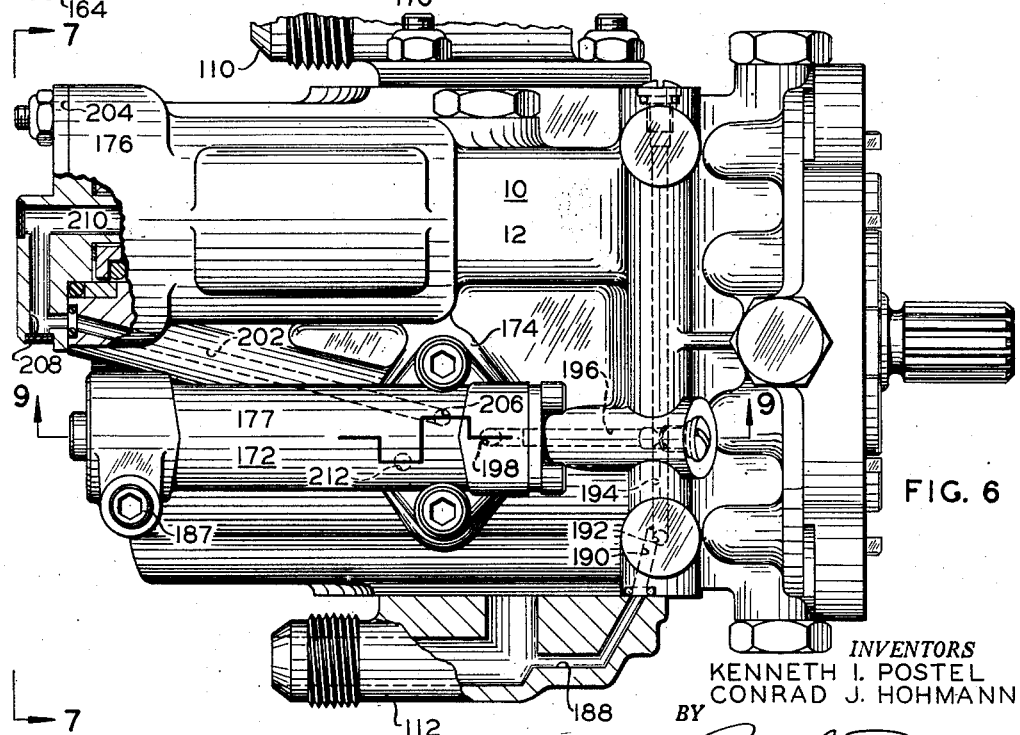
Figure 6 is a side elevation of the device shown in Figure 1.
Figure 7:
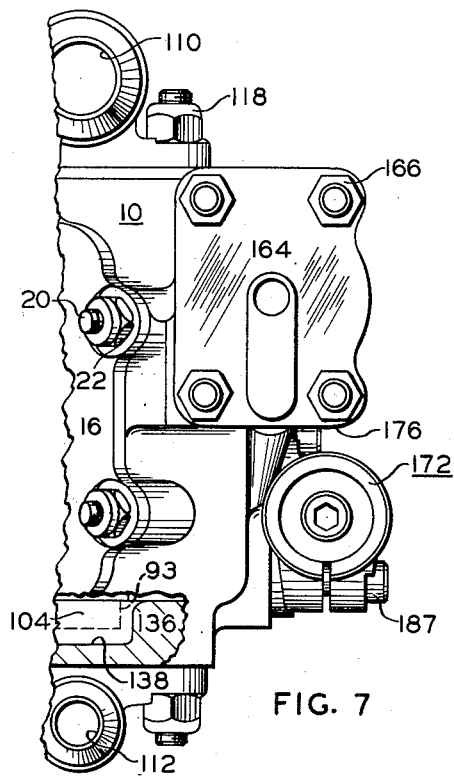
Figure 7 is a partial end elevation, partly in section, taken on line 7—7 of Figure 6.
Figure 8:
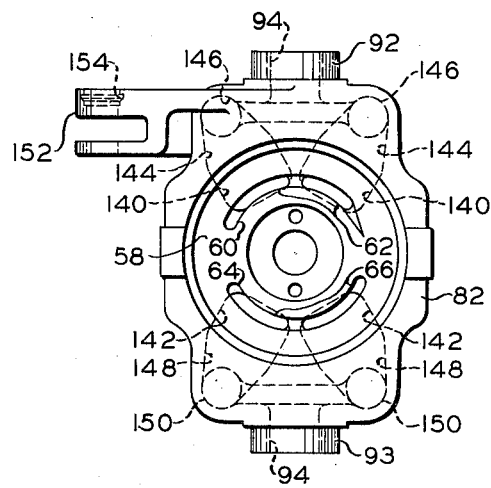
Figure 8 is another elevation of the assembly shown in Figure 2.

As can best be seen by reference to Figures 6 and 7 the longitudinal axis of the control valve 172 is parallel to that of the control piston 156, and it is positioned under the overhang of the protrusion 176, thus providing an arrangement which is extermely compact yet which affords adequate axial length to accommodate a suitable spring and adjusting mechanism for the control valve.

Figure 9:
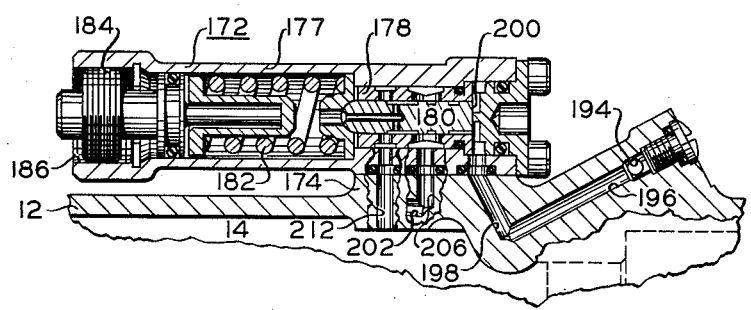
Figure 9 is a partial section on line 9—9 of Figure 6.

Referring now to Figure 9, the control valve 172 comprises a housing 177 having a sleeve 178 therein. A valve spool 180 is slidable in the sleeve 178 and cooperates therewith in a manner hereinafter described. Spool 180 is biased by a spring 182 to the normal position illustrated. An adjusting screw 184 is axially adjustable in the threaded portion 186 of the housing 177 to permit varying the loads of spring 182. Threaded portion 186 is split to permit clamping and locking by means of the screw 187.

Control valve 172 effects operation of the control piston 156 in response to outlet pressure of the pump in the following manner:

A drilled passage 188 in the outlet flange 112 conducts the operating pressure of the pump to a drilled passage 190 in the pump housing 10. A cross drilled passage 192 intersects passage 190 and conducts outlet pressure across the housing 10 to an intersecting passage 194 which is in turn intersected by an obliquely drilled passage 196 which leads to a point in the housing 10 beneath the mounting pad 174. A passage 198, as can be seen in Figure 9, extends from the surface of the mounting pad 174 to intersect passage 196.

Operating pressure of the pump unit is thus conducted from the outlet flange 112 to act on the area 200 of valve spool 180 in opposition to spring 182. Another obliquely drilled passage 202 extends from the flange face 204 of the protrusion 176, against which cover 164 abuts. Passage 202 is intersected by a short passage 206 which extends from the face of the mounting pad 174. A passage 208 in the cover 164 connects the passage 202 to the central passage 210 in the pilot 162. It is through passages 206, 202, 208, and 210 that control pressure is conducted from the control valve 172 to actuate control piston 156. A third drilled passage 212 is drilled into the face of mounting pad 174 and extends directly to the interior 14 of housing 10 where a pressure of relatively small magnitude always exists during operation of the pump.

It can be seen that, in the normal position illustrated, pilot valve 172 places passages 206 and 212 in mutual communication, thus maintaining the low pressure of the pump case on the control piston 156 to permit spring 168 to induce maximum stroke of the pump unit.

Increasing pressure in the outlet port 112, as conducted to the area 200 on the valve spool 180, will act on and overcome the spring 182 at the desired pressure setting thus shifting the spool to the left to isolate passages 206 and 212, and to conduct pressure from passage 198 to passage 206, and hence to the control piston 156, to thus induce reduction of the pump stroke.

There has thus been provided a highly compact and light weight variable displacement fluid pump or motor. Further, the light weight and compactness has been achieved without sacrifice of ruggedness or performance capacity.

How successfully this object has been achieved is best indicated by comparison between units of identical performance capacity, one of conventional construction and one built in accordance with this invention. The new unit has a weight of 8.7 lbs. compared to 13.8 lbs. for the conventional unit, or a saving of approximately 37%. The new unit measures 3⅞" from flange mounting pad to flange mounting pad compared to a 5¹¹⁄₁₆" for the conventional unit, or a saving of approximately 32%.

While the form of embodiment of the invention as herein disclosed constitutes a preferred form, it is to be understood that other forms might be adopted, all coming within the scope of the claims which follow.

What is claimed is as follows:

1. A fluid pressure energy translating device of the rotary, variable stroke type comprising: a housing; a drive shaft rotatably supported in the housing; a cylinder barrel in a driving relation with the drive shaft and having a plurality of cylinder bores therein; pistons in the bores; articulated rods connecting the pistons to the drive shaft; a distributing valve member; distributing ports in the cylinder barrel to cooperate with said valve member; means for rotatably supporting the cylinder barrel in axial abutment with the distributing valve member; a yoke supporting the valve member; hollow pintle means integral with the yoke; fluid passage means in the yoke communicating between the pintle means and the valve member; port means in the housing communicating with the pintle means; and means in the housing for journalling the pintle means for swinging movement about an axis substantially perpendicular to the drive shaft axis to vary the stroke of the unit, said means including means forming a bore in the housing having a cut-away portion through which the pintle means are movable radially of the pintle means, and a wall portion movable to its assembled location, wherein it blocks said cutaway portion, subsequent to positioning of the yoke, thereby restraining radial movement of the pintle means.

2. A fluid pressure energy translating device of the rotary, variable stroke type comprising: a housing; a drive shaft rotatably supported in the housing; a cylinder barrel in a driving relation with the drive shaft and having a plurality of cylinder bores therein; pistons in the bores; articulated rods connecting the pistons to the drive shaft; a distributing valve member; distributing ports in the cylinder barrel to cooperate with said valve member; means for rotatably supporting the cylinder barrel in axial abutment with the distributing valve member; a yoke supporting the valve member; hollow pintle means integral with the yoke; fluid passage means in the yoke communicating between the pintle means and the valve member; port means in the housing communicating with the pintle means; and means in the housing for journalling the pintle means for swinging movement about an axis substantially perpendicular to the drive shaft axis to vary the stroke of the unit, said means including means forming a bore in the housing having a cutaway portion through which the pintle means are movable radially of the pintle means, and a sleve insertable in said bore subsequent to positioning of the yoke, thereby restraining radial movement of the pintle means.

3. In a fluid pressure energy translating device of the type having a swinging two-armed yoke member for varying the displacement of the device; a body member; fluid inlet and exhaust passages formed in the yoke; a pair of coaxial, hollow pintle means integral with the yoke and forming oppositely outward opening extensions of said passages, the outward openings creating unbalanced projected areas on the yoke, the unbalanced areas resulting in inward fluid thrust on said yoke arms during operation; and bearing means in said body engaging at least one of said pintles to rotatably support that pintle in said housing and to resist inward thrust on said pintle due to fluid pressure therein, thereby localizing thrust forces on the yoke.

References Cited in the file of this patent

UNITED STATES PATENTS

| | | |
|---|---|---|
| 2,155,455 | Thoma | Apr. 25, 1939 |
| 2,298,850 | Vickers | Oct. 13, 1942 |
| 2,299,234 | Snader et al. | Oct. 20, 1942 |
| 2,313,407 | Vickers et al. | Mar. 9, 1943 |
| 2,445,232 | Molly | July 13, 1948 |
| 2,487,617 | Tweedale | Nov. 8, 1949 |
| 2,543,624 | Gabriel | Feb. 27, 1951 |
| 2,565,208 | Dietiker | Aug. 21, 1951 |
| 2,586,991 | Postel | Feb. 26, 1952 |